United States Patent [19]
Santicchi

[11] Patent Number: 5,673,798
[45] Date of Patent: Oct. 7, 1997

[54] PROCEDURE FOR EFFICIENTLY READING CHIPS SEWN ON GARMENTS PLACED IN AUTOMATIC SORTING AND COLLECTION CHAMBERS

[75] Inventor: Augusto Santicchi, Perugia, Italy

[73] Assignee: Metalprogetti Di Santicchi Augusto & C.-S.N.C., Italy

[21] Appl. No.: 446,326

[22] Filed: May 22, 1995

[30] Foreign Application Priority Data

| May 27, 1994 | [IT] | Italy | ................................. | AN94A0028 |
| May 27, 1994 | [IT] | Italy | ................................. | AN94A0029 |

[51] Int. Cl.$^6$ .................................................. B07C 5/02
[52] U.S. Cl. ................................. 209/538; 209/937
[58] Field of Search ................................ 209/538, 540, 209/542, 543, 545, 644, 937

[56] References Cited

U.S. PATENT DOCUMENTS

| 4,036,365 | 7/1977 | Rosenfeld | ..................... 209/937 X |
| 4,136,778 | 1/1979 | Wortman et al. | .................... 209/937 X |
| 4,179,032 | 12/1979 | Artz et al. | ................................ 209/538 |
| 4,457,434 | 7/1984 | Brown et al. | .......................... 209/543 X |

FOREIGN PATENT DOCUMENTS

| 583827 | 12/1977 | U.S.S.R. | ................................ 209/543 |

*Primary Examiner*—William E. Terrell
*Assistant Examiner*—Tuan Nguyen
*Attorney, Agent, or Firm*—Leonard Bloom

[57] ABSTRACT

This invention involves a procedure for efficiently reading chips sewn on garments placed in the collection chamber of automatic sorting systems, consisting in moving said garments with ID chip in the collection chamber when the chips are not read by the reading device with which the chamber is equipped.

9 Claims, 2 Drawing Sheets

5,673,798

PROCEDURE FOR EFFICIENTLY READING CHIPS SEWN ON GARMENTS PLACED IN AUTOMATIC SORTING AND COLLECTION CHAMBERS

BACKGROUND OF THE INVENTION

This design patent application involves an automatic procedure for efficiently reading chips sewn on garments and the device for activating this procedure.

Existing automatic systems for sorting garments are used for example for collecting soiled work uniforms and overalls of hospital staff, workshops and large companies that need to be laundered and returned to their respective owners.

The user simply throws the uniform or overalls into the collection chamber of the sorting system where the item is recognised and fed to the laundering system in question.

These chambers are equipped with a special antenna wound in numerous coils along the vertical walls of the chamber, starting from the bottom; this antenna recognises the garments as they are placed in the chamber and sorted accordingly.

For this purpose, each item sorted in the chamber has a chip sewn on it with a special code that is read by the antenna in question.

The procedure according to the invention is designed to resolve the practical limitations of existing automatic sorting and collection chambers which in many cases reject the garment in that the antenna does not read the code.

This inconvenience occurs when the chip sewn on the garment placed in the chamber accidentally assumes a position whereby it can not be read by the antenna of the chamber despite its wide reading angle.

Currently, the only solution in these cases is to remove the garment and place it again in the chamber in the hope that the chip will positioned in such a way as to be read by the antenna.

SUMMARY OF THE INVENTION

The inventive idea of this procedure is to move the garments automatically in the sorting chamber for a pre-set period of time when a chip is not read as a result of its position, by the coil antenna.

The random movement of the garment in the chamber aims at moving the chip sewn on the garment so as to place it in a position whereby the chip may be read by the antenna.

Should the second reading attempt also fail, the garment will be moved by means of a second cycle, and so on, until the chip is read and the garment is fed out of the chamber to the successive laundering stages.

Many different technical methods may potentially be used for realising the procedure according to the invention, provided the same are able to move the garment in the collection and sorting chamber efficiently.

Over and above the technical method used to move the garment, it is quite obvious that these devices will be operated automatically by a control board when the chip is not read by the antenna.

DESCRIPTION OF THE PREFERRED EMBODIMENT

The procedure according to the invention may either be completely automatic or semi-automatic when the moving devices are to be operated by a manual command.

For example, it would be possible to utilise devices that shake the collection chamber as a whole or alternatively, only the bottom with a upward and/or undulatory movement.

A different solution would be to equip the collection chamber with levers, arms or any other mechanical device that moves the garment so that the chip can be read, but without interfering with the successive unloading stage.

Yet another solution could be to use nozzles of compressed air that lift the garment by means of powerful forced air jets.

This last solution is the preferred embodiment of the inventive procedure in question.

In this case the sorting chamber according to the invention, having a conventional structure, is characterised by one or more compressed air nozzles positioned ideally in proximity of the bottom wall and operated by a control board.

These nozzles are activated only when the coil antenna of the chamber does not read the chip sewn on the garment within a pre-set time.

The jet or jets of compressed air investing the garment must obviously be positioned and strong enough to move the garment so that the chip can move into a position whereby the same can be read.

If the second attempt to read the chip is also unsuccessful, the control board will again activate the nozzles and so on until the chip is read and the garment is fed out of the chamber to the successive laundering stage.

The chamber according to the invention may obviously also be realised in a non automatic version whereby the nozzles are activated manually when the garment is not recognised by the antenna.

Figure 1:
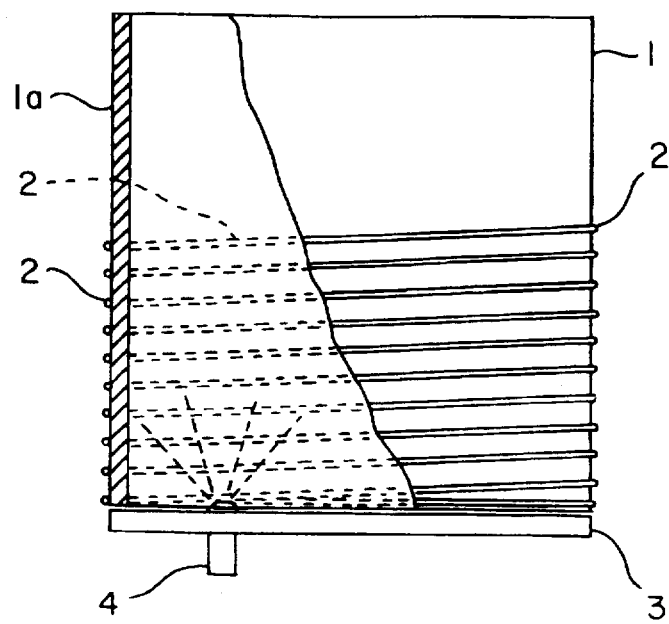
FIG. 1 is a side elevation view, in partial cutaway, of the chamber of the present invention showing the antenna and nozzle.
Figure 2:
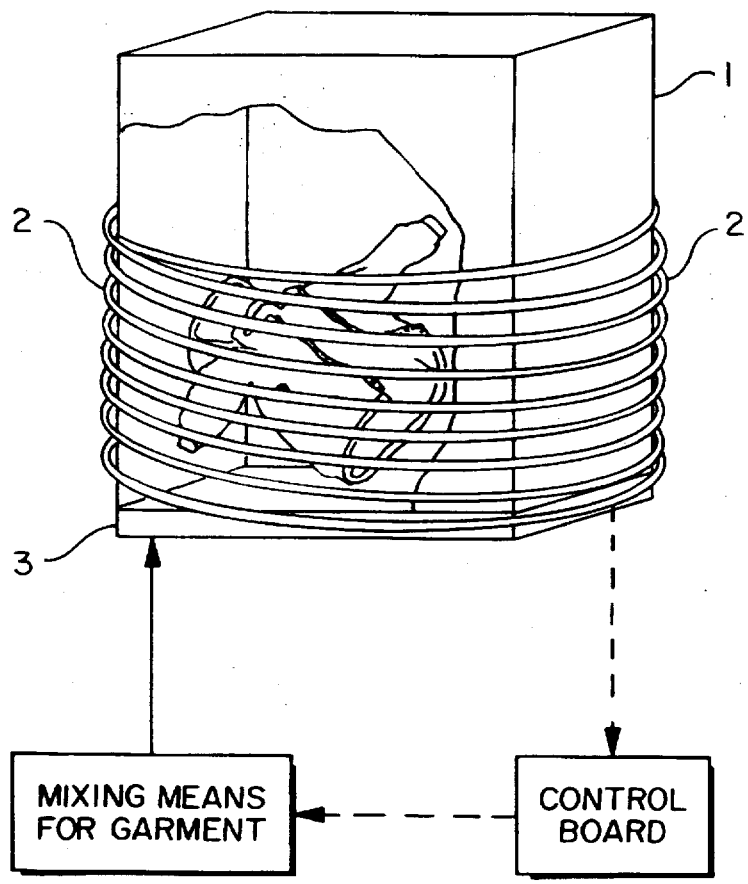
FIG. 2 is a perspective view, in partial cutaway, showing a garment with a chip in the chamber, mixing means for the garments and a control board.
Figure 3:
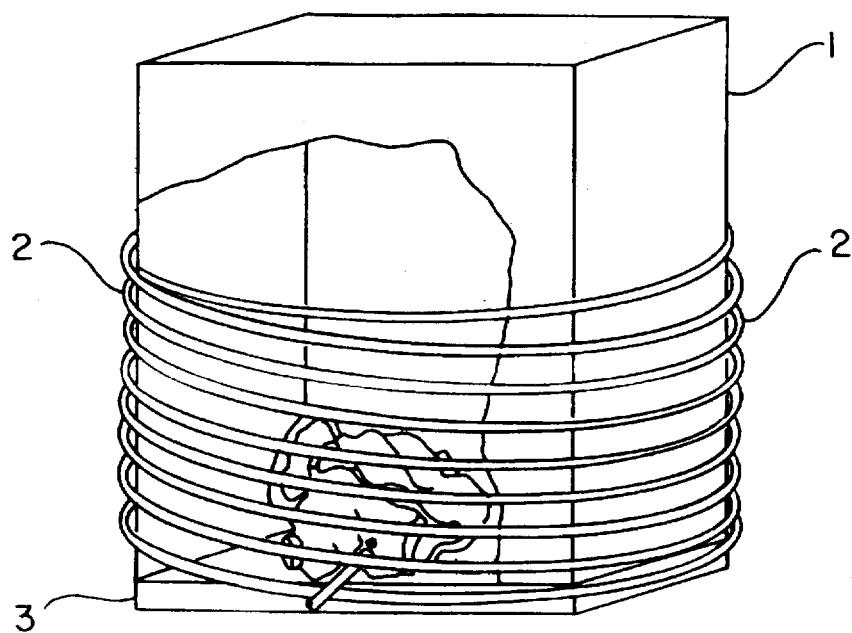
FIG. 3 is a perspective view, in partial cutaway, showing the garment with the chip in the chamber and mechanical arms in the chamber to move the garment.
Figure 4:
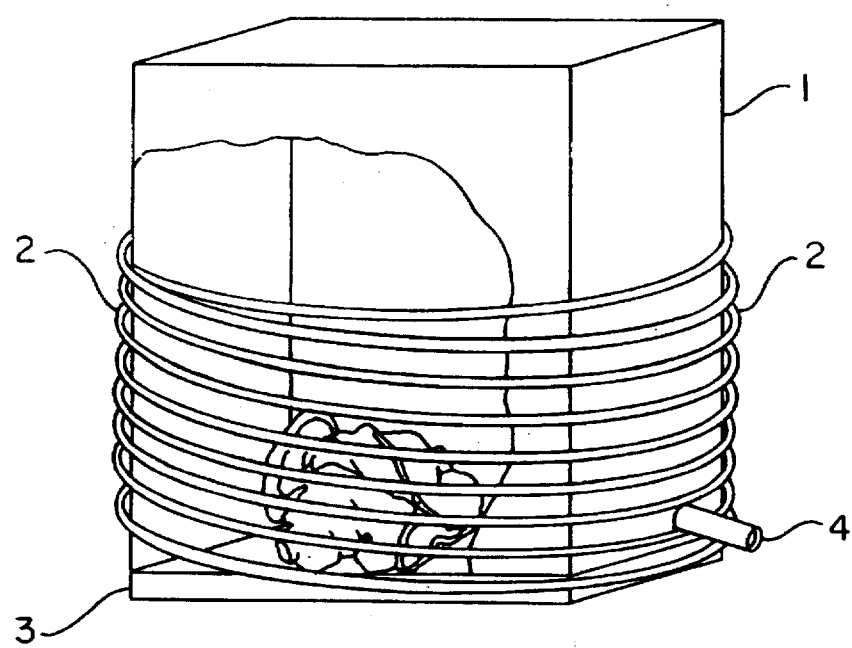
FIG. 4 is a perspective view, in partial cutaway, showing the garment with the chip in the chamber and the nozzle in the side wall.

For major clarity the description of the invention continues with reference to the enclosed drawings intended for purposes of illustration and not in a limiting sense whereby FIG. 1 is a side view of the sorting chamber according to the invention with a wall partially removed.

With reference to the enclosed drawing, the device in question consists of a chamber (1) having a coil antenna (2) wound along the side walls (1a) of the chamber (1) for approximately half the height of the sides.

Said chamber (1) is closed at the bottom by a removable horizontal wall (3) fitted with a nozzle (4) that emits a powerful jet of compressed air into the chamber (1).

Although the nozzle of the version illustrated in drawing 1 is positioned on the bottom, the compressed air nozzles could eventually also be positioned on the vertical walls of the chamber, opposite each other and staggered, but directed so as to invest the garment on the bottom of the chamber.

I claim:

1. In an automatic garment sorting system including a collection chamber and a reading device associated with said collection chamber, wherein garments are sorted in the collection chamber, each of said garments includes an identification chip applied thereto and generating a code, wherein the reading device reads said code to recognize each said garment, and wherein in certain positions of each said garment within the collection chamber, the code generated by the chip fails to reach the reading device, a means for mixing said garments randomly, said means being actuated once the code of a respective one of said garments fails to be read by the reading device, thereby allowing said garment to be positioned within the collection chamber where the reading device reads the code.

2. The means of claim 1, actuated a pre-set time period after the code fails to reach the reading device.

3. The means of claim 1, wherein the collection chamber includes a bottom, and wherein said means further includes a vibrating means vibrating said bottom of the collection chamber.

4. The means of claim 1, wherein said means further includes a mechanical means within the collection chamber randomly mixing the garments to be sorted.

5. The means of claim 1, wherein said collection chamber has at least one wall, and wherein at least one air nozzle is disposed on said at least one wall.

6. The means of claim 5, wherein said at least one wall is a bottom of the collection chamber, and wherein said at least one air nozzle is actuated when the reading device fails to read the code.

7. The means of claim 1, further includes a control board actuating and de-actuating said means for mixing the garments.

8. The means of claim 1, wherein the collection chamber has side walls and a bottom, and wherein the reading device includes a coil antenna surrounding said side walls of the collection chamber and extending from the bottom thereof.

9. In an automatic garment sorting system including a collection chamber and a reading device associated with said collection chamber, wherein garments are sorted in the collection chamber, each of said garments includes an identification chip applied thereto and generating a code, wherein the reading device reads said code to recognize each said garment, and wherein in certain positions of each said garment within the collection chamber, the code generated by the chip fails to reach the reading device, a method for moving said garment to a "readable" position, comprising the steps of: providing a means for mixing said garments randomly, and actuating said means once the code of a respective one of said garments fails to be read by the reading device.

\* \* \* \* \*